(12) United States Patent
Takeda

(10) Patent No.: US 9,170,660 B2
(45) Date of Patent: Oct. 27, 2015

(54) INPUT FUNCTION DISPLAY DEVICE

(75) Inventor: Keigo Takeda, Suwa (JP)

(73) Assignee: Seiko Epson Corporation (JP)

( * ) Notice: Subject to any disclaimer, the term of this patent is extended or adjusted under 35 U.S.C. 154(b) by 124 days.

(21) Appl. No.: 13/475,346

(22) Filed: May 18, 2012

(65) Prior Publication Data

US 2012/0299878 A1 Nov. 29, 2012

(30) Foreign Application Priority Data

May 23, 2011 (JP) ................................. 2011-114793

(51) Int. Cl.
| | |
|---|---|
| *G06F 3/042* | (2006.01) |
| *G06F 3/0354* | (2013.01) |
| *G06F 3/03* | (2006.01) |
| *G06K 9/22* | (2006.01) |
| *G09G 3/34* | (2006.01) |

(52) U.S. Cl.
CPC .......... *G06F 3/03542* (2013.01); *G06F 3/0317* (2013.01); *G06K 9/222* (2013.01); *G06K 2009/226* (2013.01); *G09G 3/344* (2013.01); *G09G 2300/0426* (2013.01)

(58) Field of Classification Search
USPC .......... 345/173–183, 55–107, 156; 178/18.01
See application file for complete search history.

(56) References Cited

U.S. PATENT DOCUMENTS

| 4,878,553 A | 11/1989 | Yamanami et al. | |
|---|---|---|---|
| 6,548,768 B1* | 4/2003 | Pettersson et al. | 178/18.01 |
| 8,264,435 B2* | 9/2012 | Jin | 345/87 |
| 2002/0046887 A1* | 4/2002 | Yanagisawa et al. | 178/18.01 |
| 2004/0035935 A1* | 2/2004 | Takahashi et al. | 235/462.09 |
| 2006/0267948 A1 | 11/2006 | Takahashi | |
| 2008/0297489 A1* | 12/2008 | Funo et al. | 345/175 |
| 2009/0309870 A1* | 12/2009 | Takei | 345/214 |

FOREIGN PATENT DOCUMENTS

| JP | 63-070326 | 3/1988 |
|---|---|---|
| JP | 2002-196875 | 7/2002 |
| JP | 2004-509781 | 4/2004 |
| JP | 2005-302508 | 10/2005 |
| JP | 2006-127081 | 5/2006 |
| JP | 3881365 | 11/2006 |
| JP | 2006-330649 | 12/2006 |
| JP | 2007-536670 A | 12/2007 |
| JP | 2009-098319 | 5/2009 |
| WO | WO 02/01281 | 1/2002 |

OTHER PUBLICATIONS

F. Jessie MacWilliams and Neil J. A. Sloanne, "Pseudo-Random Sequences and Arrays" Proceedings of IEEE, vol. 64, No. 12 (Dec. 1976) (pp. 1715-1729).

* cited by examiner

*Primary Examiner* — Kenneth B Lee, Jr.
(74) *Attorney, Agent, or Firm* — Harness, Dickey & Pierce, P.L.C.

(57) ABSTRACT

An input function display device includes: a position information reading unit that is provided with an imaging element optically reading a position information pattern representing a coordinate position on a plane; and a display unit that performs display on the basis of marks read from the position information pattern recorded in a display area, wherein the display unit includes a transparent conductive film having a conductive pattern in which the position information pattern is applied onto the transparent substrate, and a display portion that performs display using the conductive pattern as a common electrode.

7 Claims, 6 Drawing Sheets

INPUT FUNCTION DISPLAY DEVICE

BACKGROUND

1. Technical Field

The present invention relates to an input function display device.

2. Related Art

Recently, a transparent conductive film has been developed in which a thin line pattern (conductive pattern) of metal or a conductive material is printed on a resin film, as a magnetic shield of a display or a transparent electrode for a resistive film touch panel. There are expectations for this as new technology to replace an ITO conductive film, for which there are concerns of depletion of earth's resources.

As a general related art of the touch panel and pen input, there is a resistive film type and a capacitive detection type using transparent electrodes. However, a display contrast deteriorates by about 10% due to transmittance or reflectance of the transparent electrodes. Particularly, in a mobile apparatus, there are many cases where a reflectance display body with low power consumption is used to extend a battery life, and display quality is drastically decreased by a decrease of transmittance by several %.

As the related art of preventing the decrease of the display performance, there is an optical type of detecting a position of pen input using a plurality of LED light sources and a photo sensor. However, in the optical type, since the LED or photo sensor is mounted on a peripheral portion of the display body and it is necessary to secure a light path, the display area becomes narrow and the thickness of the device is increased. In addition, there is a supersonic wave type which measures a retuning time of a supersonic wave to detect a position, but, as with the optical type, there is a problem in that the display area becomes narrow and the thickness of the device is increased.

JP-A-2005-302508 discloses a transparent conductive sheet having a conductive face formed of a transparent conductive film and a thin line structure of metal or alloy. JP-A-2006-330649 discloses a technique of detecting intensity of light by a display body driving TFT and inputting coordinates. JP-A-2002-196875 discloses an optical input technique in which a coordinate plate and a display body are partially shared. Furthermore, JP-A-63-70326 discloses a basic technique of an electromagnetic position detecting device. In this technique, a magnetic field generated from an electronic pen is detected by a plurality of loop antennas and an antenna substrate is provided under a display body.

The technique disclosed in JP-A-2005-302508 is proposed as the transparent conductive sheet for the resistive film touch panel, at least two opposed sheets are necessary, and there is a drawback that it may not be also used in a common electrode of a display body from the influence of noise.

The technique disclosed in JP-A-2006-330649 is limited to a specific display body or driving circuit, a lot of emission lightings are necessary in a periphery of a display body, and thus there are concerns about the narrowing of the display area and an increase of the thickness of the device.

The technique disclosed in JP-A-2002-196875 does not achieve sharing of an electrode layer with a coordinate plate and a display body similarly to the touch panel of the related art, and there are concerns of a decrease in transmittance. Even in JP-A-63-70326, it is difficult to reduce a size of a device, due to having a configuration in which an antenna substrate is provided under display body.

SUMMARY

An advantage of some aspects of the invention is to provide an input function display device in which a decrease of display quality and narrowing of a display area are suppressed and to cause the device to be thin.

According to an aspect of the invention, there is provided an input function display device including: a position information reading unit that is provided with an imaging element optically reading a position information pattern representing a coordinate position on a plane; and a display unit that performs display on the basis of marks read from the position information pattern recorded in a display area, wherein the display unit includes a transparent conductive film having a conductive pattern in which the position information pattern is applied onto the transparent substrate, and a display portion that performs display using the conductive pattern as a common electrode.

With such a configuration, while moving the position information reading unit in a display area (input face) where a coordinate system is defined, the display is performed at a part designating the position, and thus it is possible to perform handwriting input to the display portion (display area) of the display unit. In the invention, the conductive pattern to which the position information pattern is applied serves (also) as the common electrode of the display portion, it is not necessary to provide the conductive pattern separately from the common electrode, and thus it is possible to reduce the thickness of the device. Because the common electrode also serves as the conductive pattern, it is possible to prevent transmittance from decreasing. In the invention, by using the method of optically reading the position information pattern while capturing an image of the position information pattern using the position information reading unit, there is no worry that electrical noise occurs, and it is not necessary to mount the LED and the photo sensor in the peripheral portion of the display area as described in the related art. Accordingly, it is possible to prevent the display area from being narrow, and to reduce the thickness of the device without decreasing the display quality.

The position information pattern may be a 2-dimensional pattern called M plane.

With such a configuration, it is possible to accurately understand the position of the display area using characteristics (unique value) of the M plane.

The conductive pattern may be formed of a first thin line pattern and a second thin line pattern perpendicular thereto, and the position information pattern may be formed of a dot pattern provided at an arbitrary position of matrix intersection points of the first and second thin line patterns.

With such a configuration, it is possible to detect the input coordinate position on the basis of a predetermined calculation formula using the M plane including a specific pattern of the dot pattern.

The conductive pattern may be configured to allow visible light to pass and absorb infrared light.

With such a configuration, it is possible to detect only the position information pattern except for the background light of the display portion, and thus it is possible to obtain accurate position information. An S/N ratio caused by periphery environment light (visible light or the like) is prevented from being decreased, and thus it is possible to read the position information pattern.

The conductive pattern may be configured to have flexibility.

With such a configuration, it is possible to handle a flexible display device.

The display portion may be configured to be an electrophoretic display device.

With such a configuration, it is possible to keep the display contents even when the power supply from the outside is stopped, and thus it is possible to obtain the input function display device capable of achieving low power consumption.

The display portion may be a nonvolatile display device.

With such a configuration, it is possible to keep the display contents even when the power supply from the outside is stopped, and thus it is possible to obtain the input function display device capable of achieving low power consumption.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. On the screens used in the following description, a scale of main members is appropriately modified such that the members have recognizable sizes.

First Embodiment

Figure 1:
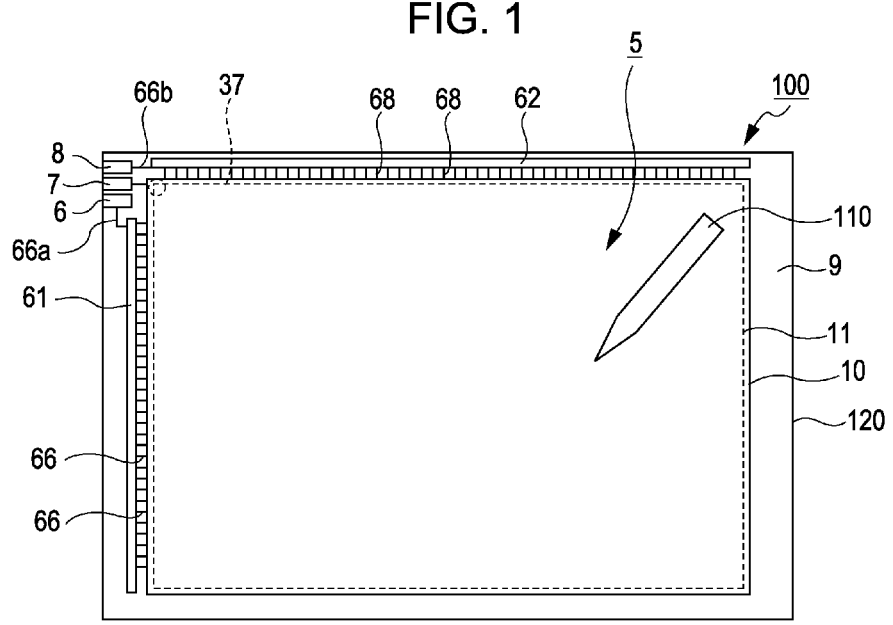
FIG. 1 is a plan view illustrating an overall configuration of an input function display device of the invention.
Figure 2:
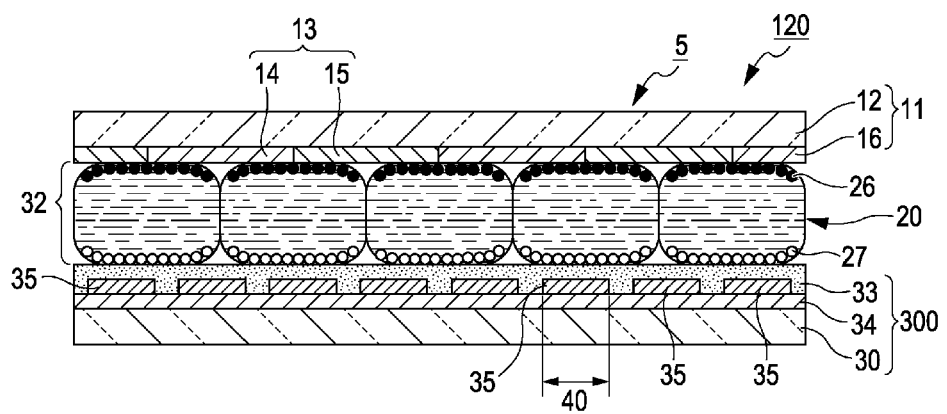
FIG. 2 is a cross-sectional view illustrating a schematic configuration of a display body in an input function display device.

FIG. 1 is a plan view illustrating an overall configuration of an input function display device of the invention. FIG. 2 is a cross-sectional view illustrating a schematic configuration of a display body in the input function display device.

As shown in FIG. 1 and FIG. 2, the input function display device 100 includes an electronic pen (position information reading unit) 110, and a display body (display unit) 120, and is a display device which can perform handwriting input to a display face of the display body 120 using the electronic pen 110. Herein, handwriting information is displayed by acquiring time series data of a contact point of the electronic pen 110 to the display face of the display body 120 using the position information pattern 16 as a unit that detects position information (coordinate value in change of time) of the electronic pen 110 of the display body 120.

The display body 120 is formed of a display body (display portion) 10 having a coordinate body (transparent conductive film) 11 on the view side, and a housing 9 that houses the display body 10. The display body 10 is housed in the housing 9 in a state where the coordinate body 11 provided on the display face is exposed, and is configured so as to perform the handwriting input by the electronic pen 110 on the display face.

An electrophoretic display (hereinafter, referred to as "EPD") having an electrophoretic element 32 (FIG. 2) that is a storage display element is used as the display body 10, which has a display area 5 where a plurality of pixels 40 are arranged in matrix on the display face. In the electrophoretic element 32, a plurality of microcapsules 20 are arranged on the outmost face of an element substrate 300.

A display device other than the electrophoretic element may be used as the display body 10, which is appropriately selected from, for example, a liquid crystal display device and an OLED.

It is necessary for various display bodies described above to have an outer peripheral space called a frame, from the viewpoint of mounting a seal structure or a driving IC. Although not shown, in the housing 9, a wireless communication unit of the display body 10, a control unit, a driving control unit, and the like are provided.

In the display area 5, m scanning lines 66 and n data lines 68 are formed, and pixels 40 are provided corresponding to intersection point positions of the scanning lines 66 and the data lines 68. Each pixel 40 is provided with a selection transistor (not shown), a pixel electrode 35, and an electrophoretic element 32.

The selection transistor is a pixel switching element formed of, for example, an NMOS (Negative Metal Oxide Semiconductor)-TFT (Thin Film Transistor). A gate terminal of the selection transistor is connected to the scanning line 66, a source terminal is connected to the data line 68, and a drain terminal is connected to the pixel electrode 35.

In the peripheral area of the display area 5, the plurality of scanning lines 66 extending from the display area 5 are connected to a parallel output of a shift register 61, and a connection line 66a that is a serial input of the shift register 61 and connection terminals 6, 7, and 8 are formed. The connection terminal 6 is connected in a serial parallel conversion manner to all the scanning lines 66 of the display area 5, in which the connection line 66a is an input. The connection terminal 8 is connected to all the data lines 68 of the display area 5 through the shift register 62, in which the connection line 66b is a serial input. The connection terminal 7 is connected to the conductive pattern 13 of the coordinate body 11 formed as a common electrode in the plurality of pixels 40. The connection terminals 6, 7, and 8 are connected to the controller. The controller controls an image display operation of the display area 5 on the basis of the signal input from the electronic pen 110. Specifically, predetermined potential is input to the scanning lines 66 and the data lines 68 through the connection terminals 6 to 8 to display a predetermined image in the display area 5.

A circuit layer 34 provided with the scanning lines 66, the data lines 68, and the selection transistors is provided on the electrophoretic element 32 side of the first substrate 30 in the display area 5, and the plurality of electrodes 35 are arranged and formed on the circuit layer 34.

Since the element substrate 300 has the first substrate 30 formed of glass or plastic and is disposed on the opposite side to the image display face, the element substrate 300 may not be transparent. The pixel electrode 35 is an electrode formed by sequentially laminating a nickel coat and a gold coat on a Cu (copper) film, and is an electrode for applying voltage to the electrophoretic element 32 formed of Al (aluminum) and ITO (indium tin oxide).

The plurality of microcapsules 20 attached and bonded onto the element substrate 300 through a conductive adhesive 33 have a particle diameter of, for example, about 50 μm, in which a dispersion medium 21, a plurality of white particles (electrophoretic particles) 27, and a plurality of black particles (electrophoretic particles) 26 are sealed.

The coordinate body 11 is formed to have a size corresponding to the display area 5, is disposed on the element substrate 300 through the electrophoretic element 32, and is formed of a transparent conductive film having a transparent resin film 12 formed using a material such as PET and a conductive pattern 13 formed on one side of the resin film 12.

The conductive pattern 13 is common for the plurality of pixel electrode 35 on the display body 10 side, is an electrode for applying voltage to the electrophoretic element 32 together with the plurality of common electrodes, and is formed of metal such as Al (aluminum), Ag (silver), Au (gold), Cu (copper), Ni (nickel), Cr (chrome), and Mo (molybdenum) or an alloy thereof and a conductive coating material.

The conductive pattern 13 is a 2-dimensional pattern formed by combination of a 1-dimensional thin line pattern (first thin line pattern) 14 and a 1-dimensional thin line pattern (second thin line pattern) 15 intersecting thereto, and is formed in a lattice shape (mesh shape) through a process such as printing and coating. A line width of the thin line patterns 14 and 15 is about 10 to 30 μm, and a pitch thereof is about 100 to 200 μm. As described above, the pitch of a predetermined distance is kept with the narrow line width, the thin line pattern does not allow light to pass, but the overall sheet shows a high light transmittance and a low sheet resistance value.

The value (surface resistance rate) of the sheet resistance of the transparent conductive film formed of the metal thin film is 50 (Ω/□, Ω/sq).

Figure 3:
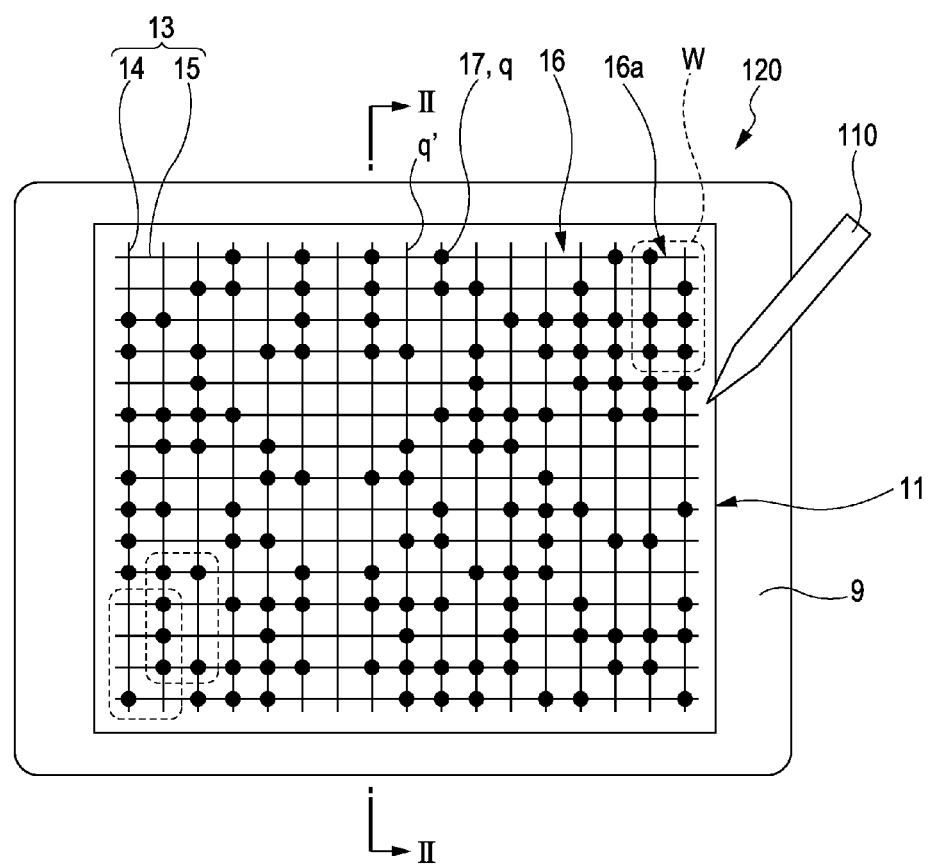
FIG. 3 is a plan view illustrating a schematic configuration of a position information pattern.

FIG. 3 is a plan view illustrating a schematic configuration of the position information pattern.

As shown in FIG. 3, the position information pattern 16 is given to the conductive pattern 13. The position information pattern 16 is a pattern for obtaining the position information on the display area 5 by representing the coordinate value by the dots 17 arbitrarily provided at the matrix intersection points of the thin line patterns 14 and 15.

As shown in FIG. 3, the position information pattern 16 is a 2-dimensional pattern called an M plane, and has the plurality of dots 17 disposed at predetermined intersection point positions in the conductive pattern 13. From a 2-dimensional code obtained by existence and nonexistence of the dot 17 at the intersection position, the 2-dimensional position is uniquely defined, an intersection q to which the dot 17 is attached represents a code [1], and an intersection q' to which no not 17 is attached represents a code [0]. The lines of the code [1] and the code [0] are the code plane of the M plane. For example, in a case of the M plane of 4 bits, it is uniquely determined that the designated position is any position on a partial pattern in a small unit area, that is, the position information pattern 16 by a 4-digit code acquired by the existence and nonexistence, the number, and disposition of the dots 17.

Specifically, the position information pattern 16 constitutes the M plane formed of 15×17 bits corresponding to the display area 5, and the positions of the intersection points q are the same as the coordinates (pixels 40) of the display body 10. On the M plane, a partial pattern 16*a* of 4×2 bits is given to each window W (small unit area) corresponding to an imaging area of the electronic pen 110. In the partial pattern 16*a*, the dot pattern (the number and the disposition of dots 17) is different according to the position of the position information pattern 16, and thus it is possible to obtain only one value (coordinate position) in the whole of the M plane when the partial pattern 16*a* of a predetermined window W is read by the electronic pen 110.

Hereinafter, the plane size (15×17 bits) of the M plane will be described.

An M plane having a maximum period length: n, a plane size: n1×n2, and a window size: k1×k2, in a finite volume GF(q) is assumed.

$$n = q^m - 1$$

$$m = k_1 \times k_2$$

$$(n_1 = q^{k_1} - 1,\ n_2 = n/n_1) \quad \text{Formula 1}$$

Accordingly, in the position information pattern 16 of the embodiment, it is GF(2) (codes [0] and [1]).

$$n = 2^m - 1 = 255$$

$$\therefore m = 8 = k_1 \times k_4 = 4 \times 2$$

$$(8 \times 1 \text{ also possible})\ n_1 = 2^4 - 1 = 15,\ n_2 = 17 \quad \text{Formula 2}$$

The plane size n is 15×17.

Accordingly, it is the M plane of 15×17 bits.

In the embodiment, the position information pattern 16 is provided, and thus for each coordinate in the display area 5, unique coordinate information corresponding to each coordinate is assigned individually. The coordinate information can be assigned by encoding at the plurality of dots 17 dispersed in the small unit area in the display area 5, the position information pattern 16 formed of the plurality of dots 17 is optically read by the electronic pen 110 (FIG. 4), and thus it is possible to obtain arbitrary coordinate position information.

A predetermined small unit area of the position information pattern 16 of the coordinate body 11 is imaged using the electronic pen 110, and a predetermined bit number is acquired to acquire a digital code, as the code [1] when there is the dot 17 at the intersection point position in the area, and as the code [2] when there is no dot 17. This is a partial code representing the position on the M plane, and thus this is converted into the corresponding coordinate by table conversion. In FIG. 3, the positions of the windows W at three parts are surrounded and represented by dot lines. Accordingly, the value is subjected to back calculation or reference of the reference table, to uniquely determine the coordinate of the designated position. When the data read by the electronic pen 110 is transmitted from the electronic pen 110 to the control unit on the display body 10 side by wireless or optical communication and the corresponding pixel in the display body 10 is turned on, it is possible to perform handwriting inputting.

In the embodiment, the position information pattern 16 is configured by the dot pattern representing the codes [1] and [0] by existence and nonexistence of the dots 17, but the pattern configuration of the dot pattern is arbitrary. The number of dots 17 is arbitrary. In the actual display area 5, the number of pixels of 256×256 or more and the windows of 6×6 or more are necessary. When it is possible to give a lot of bit information per one position information pattern 16, it is possible to reduce the size of the window. Accordingly, it is possible to reduce the size of the electronic pen 110.

Next, a schematic configuration of the electronic pen will be described.

Figure 4:
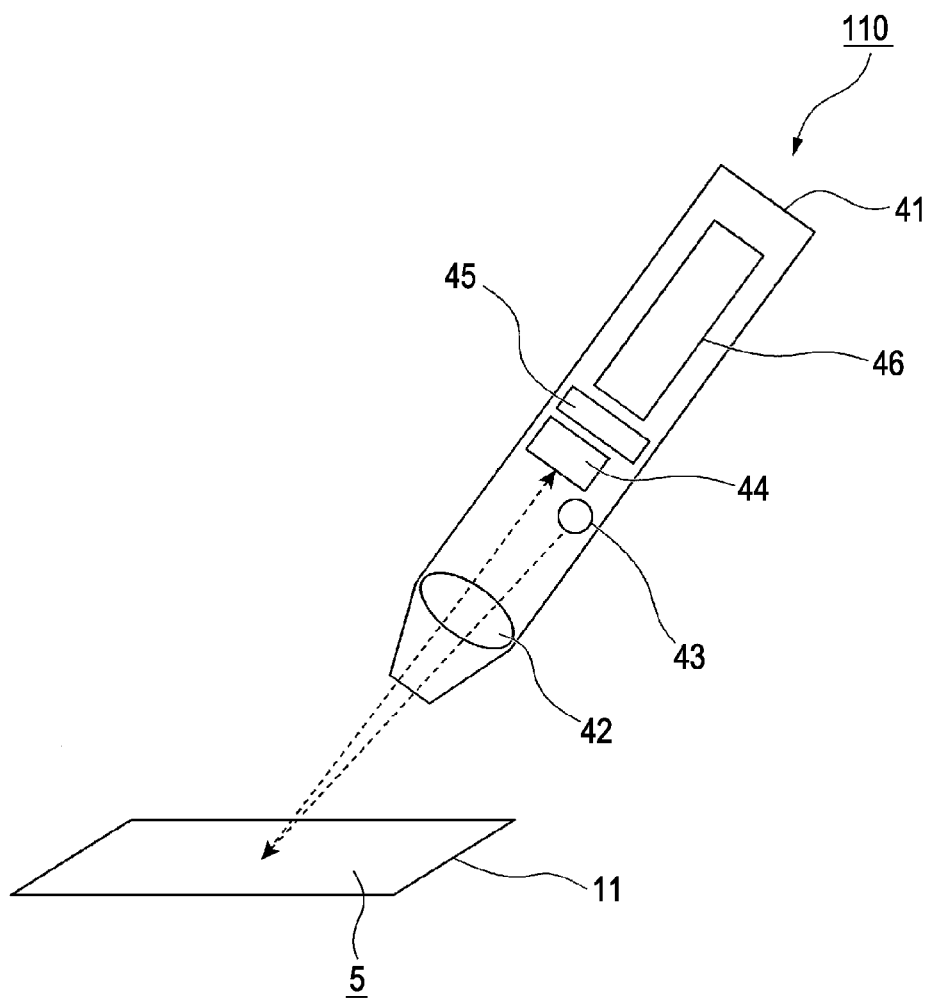
FIG. 4 is a diagram illustrating a schematic configuration of an electronic pen according to the invention.

FIG. 4 is a diagram illustrating a schematic configuration of the electronic pen according to the invention.

As shown in FIG. 4, the electronic pen 110 of the example includes a collimator lens 42, a light emitting element 43, an imaging element 44, an electronic circuit component 45, and a battery 46 in a thin rod-shaped pen type case 41. As the light emitting element 43, a light emitting diode (LED) or a laser diode (semiconductor laser) is appropriate. As the imaging element 44, a CCD camera or a CMOS sensor capable of capturing and recording an image of the partial pattern of the small unit area of the position information pattern is used. Semiconductor sensor light sensitivity thereof has a peak around 600 nm, and a light emitting element of an infrared area may be used to suppress an influence of the displayed image. In this case, an infrared transmission filter which allows infrared light to pass and blocks visible light is disposed with the collimator lens 42. That is, emission of the infrared light is used as the light emitting element, the infrared transmission filter is used as the filter, and thus it is possible to remove the background light (displayed image) other than the position information pattern 16. As a result, it is possible to obtain the accurate position information pattern based on the electronic pen 110 on the display area 5 of the display body 10.

A pyroelectric element that detects light including the infrared light by a pyroelectric effect may be used.

The electronic circuit component 45 includes an image processing unit such as a CPU that performs light emission, image capturing, and a detection calculation processes, and a wireless circuit that transmits the detected data to the main body.

Power of the electronic pen 110 is supplied from the battery 46 provided in the pen type case 41.

It is not necessary to turn on the light emitting element 43 always, and the light emitting element 43 performs illumination in a pulse manner to the display area 5 of the display body 10 at an imaging timing based on a canning speed of the electronic pen or the imaging element, and controls light emission time and power consumption according to the illumination (background brightness) of the display body 10.

When the information obtained by the imaging element 44 at the time of previous illumination is fed back to the time of the next illumination, the S/N ratio is further improved.

In the embodiment, the position on the display area 5 is specified from the partial pattern detected by the imaging unit provided at the pen tip of the electronic pen 110, and the trace of the pen tip is input as handwriting to the display area 5. That is, the time series coordinate data (stroke data) of the electronic pen 110 becomes handwriting data. In the embodiment, a method of optically reading the position information pattern 16 corresponding to the display area 5 is used, and thus the position of the display area 5 is uniquely determined even when the electronic pen 110 is detached from the main body 120.

The position information pattern 16 allows the visible light to pass and absorbs the infrared light, it is possible to detect only the position information pattern 16 without the background light of the display portion by the electronic pen 110, and thus it is possible to obtain the accurate position information without the influence of noise. The decrease of the S/N ratio caused by the peripheral periphery light (visible light or the like) is avoided, and it is possible to read the position information pattern 16.

EXAMPLE 1

Figure 5A:
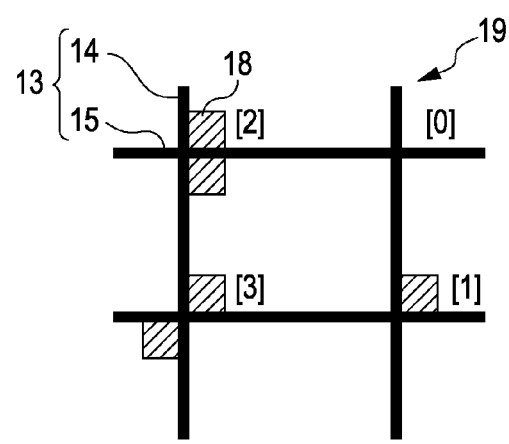
FIG. 5A is a diagram illustrating a position information pattern in Example 1.
Figure 5B:
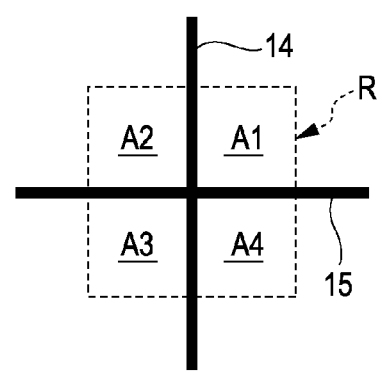
FIGS. 5B and 5C are diagrams illustrating a relationship between quadrant and marks at a reference position.
Figure 5C:
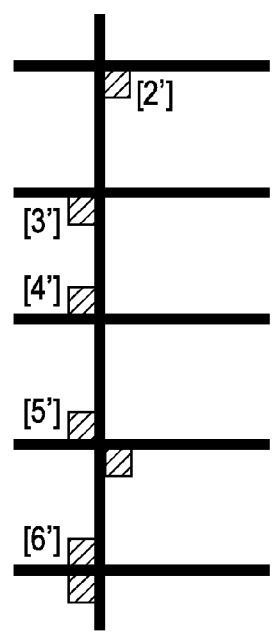

FIG. 5A is diagram illustrating a position information pattern in Example 1, and FIG. 5B and FIG. 5C are diagrams illustrating a relationship between quadrants and marks at the reference position.

As shown in FIG. 5A, the position information pattern 19 is configured by the dots 18 assigned to the plurality of intersection points of the thin line patterns 14 and 15, represents a numerical value [0] at the intersection point where no dot 18 is provided, and represents numerical values [0] to [3] according to the number and the disposition of dots 18 at the intersection point areas, at the intersection points where the dots 18 are provided.

The position information pattern 19 has a reference position corresponding to the intersection point of the conductive pattern 13, and an arbitrary numerical value (coordinate value) is determined by the existence and nonexistence of the dots 18 or the disposition of the dot 18 with respect to the reference position. The shape of a dot 18 is not particularly limited, but a simple and easily detectable shape is preferable. The coordinate value is based on the number and the disposition of the dots 18, and thus the plan shape of the dot 18 may be uniform. In addition, the dots 18 are disposed at the position where the reference position is not covered.

In FIG. 5B, the first quadrant A1 (x>0, y>0), the second quadrant A2 (x<0, y>0), the third quadrant A3 (x<0, y<0), and the fourth quadrant A4 (x>0, y<0) are shown. Referring to FIG. 5B, as a specific example representing numerical values different according to the number and disposition of the dots 18 assigned to the intersection point area R in the example, coincidence [1] is represented by one dot 18 present in the first quadrant A1 (x>0, y>0), and coincidence [2] is represented by two dots 18 disposed in the first quadrant A1 and the fourth quadrant A4 (x>0, y<0) according to the thin line pattern 14. In addition, coincidence [3] is represented by two dots 18 obliquely disposed in the first quadrant A1 and the third quadrant A3 (x<0, y<0) of the intersection point area R.

An identification unit or previous setting is provided up, down, left, and right such that the conductive pattern 13 is not a rotation target, and thus a pattern representing [2'], [3'], [4'], [5'], and [6'] may be used as shown in FIG. 5C. As the unit to identify the rotation state of the conductive pattern 13, asymmetry of the pattern may be conceivable.

As described in the example, 0 to 4 data based on the existence and nonexistence or the number of dots 18 are embedded at the intersection point position of the conductive pattern 13 provided in the display area 5, and thus it is possible to obtain arbitrary coordinate position information only by reading the windows of 2×2 corresponding to the small unit area on the position information pattern 19.

EXAMPLE 2

Figure 6:
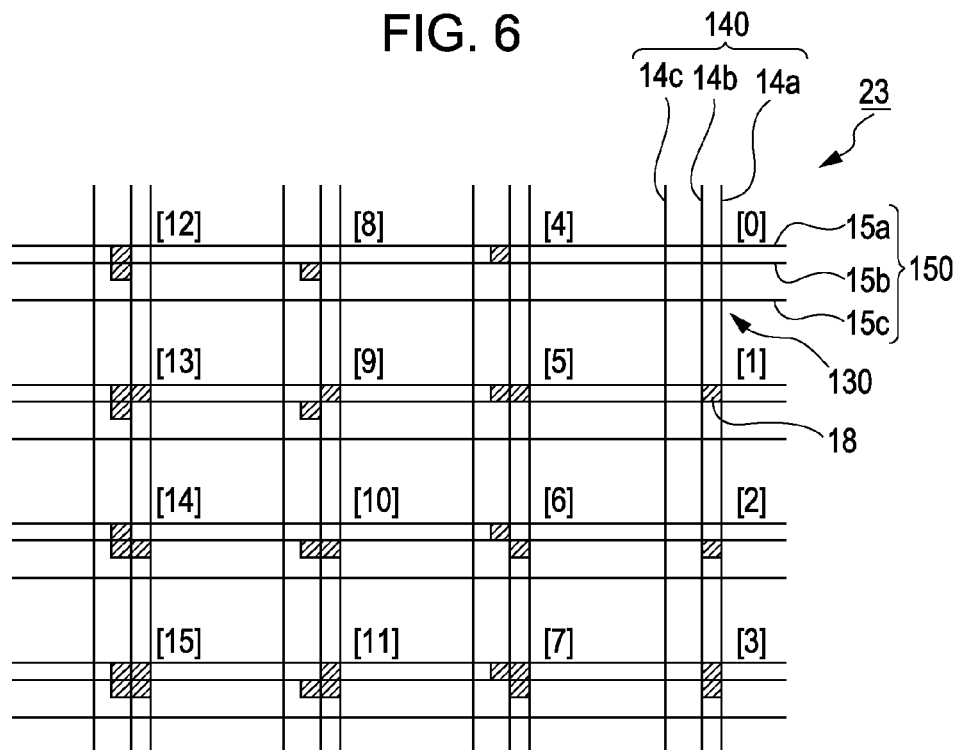
FIG. 6 is a diagram illustrating a position information pattern in Example 2.

FIG. 6 is a diagram illustrating a position information pattern in Example 2.

As shown in FIG. 6, the position information pattern 23 in the example has a conductive pattern 130 in which a thin line pattern (first thin line pattern) 140 with one set of three thin lines 14a, 14b, and 14c and a thin line pattern 150 with one set of three thin lines 15a, 15b, and 15c (second thin line pattern) are arranged in a lattice shape, and it is possible to identify a rotation state of the conductive pattern 130 by asymmetry between pitch widths of the thin lines 14a, 14b, and 14c and pitch widths of the thin lines 15a, 15b, and 15c.

The reference position of the position information pattern 23 is regulated by the intersection point of the thin lines 14b and 15b of the thin line patterns 140 and 150 intersecting with each other, and the coordinate value is represented by the disposition of the dots 18 with respect to the reference position.

The coordinate value is encoded by the existence and nonexistence, the disposition, and the number of the dots 18 disposed at each reference position, and it is possible to make marks of [0] to [15] as shown in FIG. 6.

The preferred embodiments according to the invention have been described above with reference to the accompanying drawings, but it is obvious that the invention is not limited to the related examples. It is clear that a person skilled in the art can think of various modified examples and amended examples in the scope of the technical concept described in Claims, and it is obviously understood that they belong to the technical scope of the invention.

Figure 7:
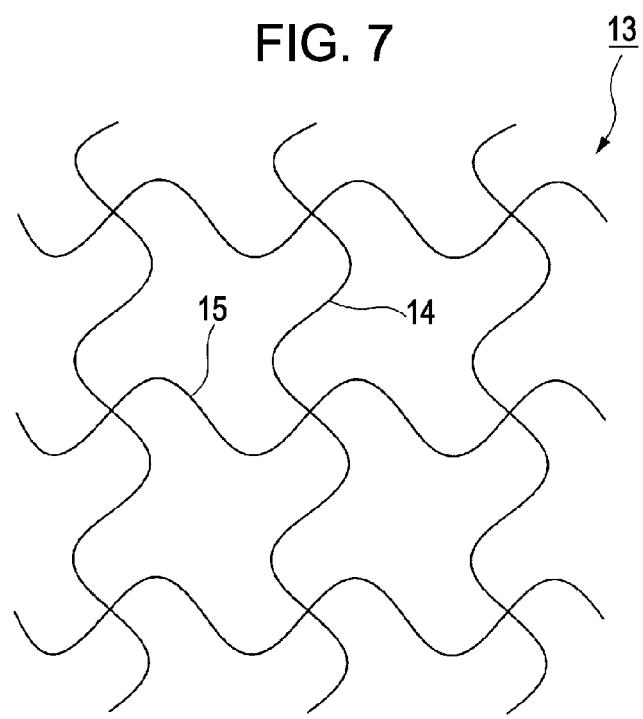
FIG. 7 is a diagram illustrating a modified example of a conductive pattern.
Figure 8A:
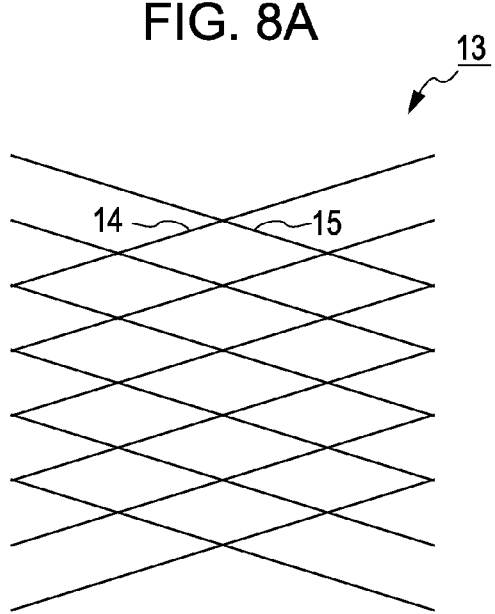
FIGS. 8A and 8B are diagrams illustrating a modified example of a conductive pattern.
Figure 8B:
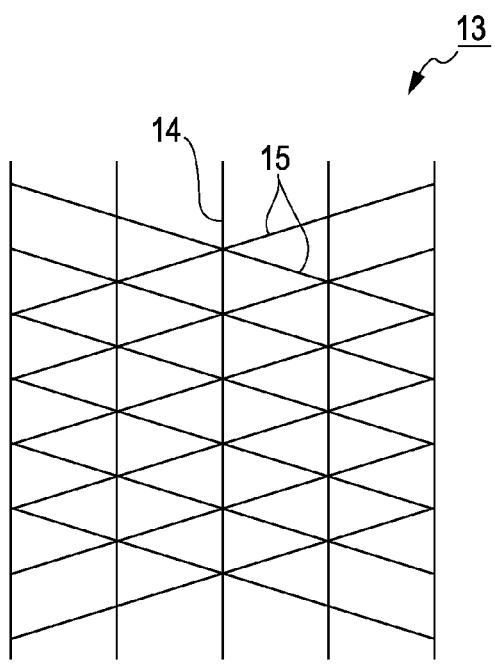

For example, the thin line patterns 14 and 15 constituting the conductive pattern 13 may be curved lines (FIG. 7). The angle of the intersection of the thin line patterns 14 and 15 may not be a right angle (FIG. 8A), and three or more thin line patterns 14, 15, and 15 may intersect (FIG. 8B). Even in such a case, it is possible to form and recognize the position information pattern according to the method described above.

For example, the conductive pattern may have flexibility. Accordingly, it is possible to cope with a flexible display device.

In the embodiment described above, the electrophoretic display device using the electrophoretic element is employed as the display body 10, but the invention is not limited thereto, and a nonvolatile display device may be used. Accordingly, it is possible to keep the display contents even when the power supply from the outside is stopped, and thus it is possible to obtain the input function display device capable of achieving low power consumption.

The entire disclosure of Japanese Patent Application No. 2011-114793, filed May 23, 2011 is expressly incorporated by reference herein.

What is claimed is:

1. An input function display device comprising:
    a display unit that displays an image, the display unit including:
        a substrate;
        a pixel electrode over the substrate;
        a display member over the pixel electrode;
        a transparent resin film over the display member; and
        a transparent conductive film on the transparent resin film, the transparent conductive film having a position information pattern that has position coordinate information, and being provided between the transparent resin film and the display member; and
    a position information reading unit that has an imaging element, wherein
    the imaging element of the position information reading unit detects the position coordinate information,
    the display unit displays the image based on the detected position coordinate information by using the position information pattern as a pixel common electrode,
    the position information pattern is configured of a dot pattern provided at an arbitrary position of only matrix intersections of a plurality of first lines and a plurality of second lines perpendicular to the plurality of first lines so that the dot pattern is physically connected to one of the matrix intersections,
    the plurality of first lines and the plurality of second lines are electrically connected to the pixel electrode so as to apply a voltage to the display member,
    first intervals between the plurality of first lines are different from each other;
    second intervals between the plurality of second lines a e different from each other; and
    a rotational state of the position information pattern is determined by the position information reading unit.

2. The input function display device according to claim 1, wherein the position information pattern is a 2-dimensional pattern.

3. The input function display device according to claim 1, wherein the position information pattern passes visible light and absorbs infrared light.

4. The input function display device according to claim 1, wherein the position information pattern has mechanical flexibility.

5. The input function display device according to claim 1, wherein the display member is an electrophoretic display device.

6. The input function display device according to claim 1, wherein the display member is a nonvolatile display device.

7. The input function display device according to claim 1, wherein
    the imaging element of the position information reading unit detects the position coordinate information within a plurality of unit windows located on the transparent conductive film, and
    the detected position coordinate information of the plurality of unit windows are different from each other.

* * * * *